United States Patent [19]
White

[11] 3,756,428
[45] Sept. 4, 1973

[54] APPARATUS FOR HANDLING BALES
[76] Inventor: Hollis N. White, Rt. 1, Maryville, Mo.
[22] Filed: Oct. 29, 1971
[21] Appl. No.: 193,796

[52] U.S. Cl. ................. 214/6 B, 214/6 G, 214/394, 214/83.26, 214/517
[51] Int. Cl. ..................... B65g 57/32, B65g 57/112
[58] Field of Search .................... 214/6 B, 6 G, 6 H, 214/6 P, 6 DK, 390, 392, 394, 396, 517, 83.26

[56] References Cited
UNITED STATES PATENTS

| | | | |
|---|---|---|---|
| 3,445,006 | 5/1969 | Fleming | 214/6 B |
| 3,512,659 | 5/1970 | Vanderkrogt | 214/6 B |
| 3,515,292 | 6/1970 | Oborny | 214/6 B |
| 3,367,518 | 2/1968 | Bishop | 214/6 B |
| 3,523,616 | 8/1970 | Weely, Jr. | 214/6 B |
| 3,189,205 | 6/1965 | Quayle | 214/6 G |
| 3,494,491 | 2/1970 | Sumida | 214/394 |
| 3,450,033 | 6/1969 | Bornzin | 214/6 B |
| 3,400,840 | 9/1968 | Fischer | 214/6 B |
| 3,513,991 | 5/1970 | McWilliams | 214/6 G |
| 3,415,399 | 12/1968 | Nunes, Jr. | 214/390 |

*Primary Examiner*—Robert J. Spar
*Attorney*—Dawson, Tilton, Fallon & Lungmus

[57] ABSTRACT

Apparatus for handling bales of hay which incorporates a novel chute for positioning bales on a pallet or wagon.

6 Claims, 6 Drawing Figures

PATENTED SEP 4 1973

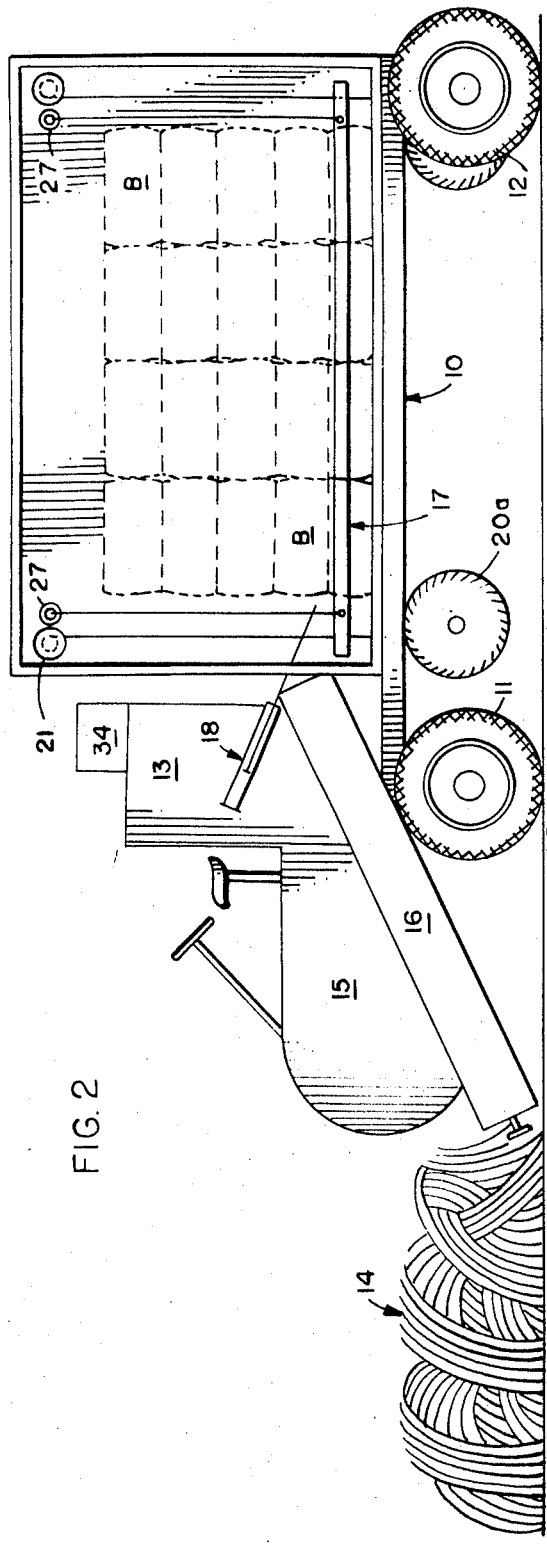
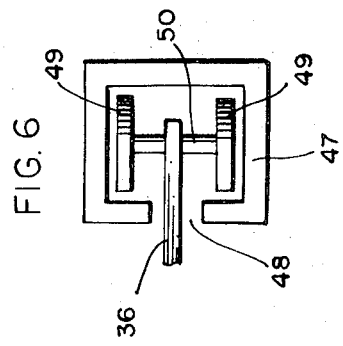
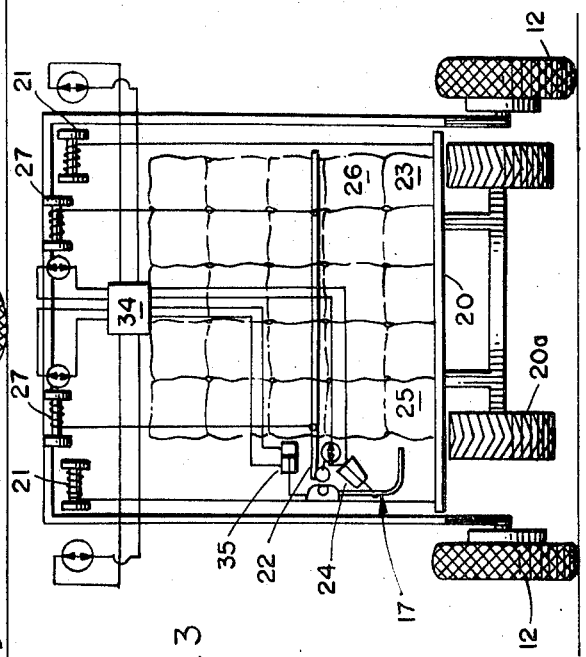
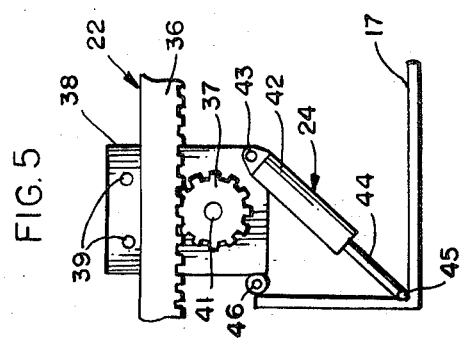

APPARATUS FOR HANDLING BALES

BACKGROUND AND SUMMARY OF INVENTION

Although hay has been baled for years, the normal operation has involved the use of a number of men to get the bales properly positioned on a pallet or wagon. For years, there has existed the need for a suitable labor saving device for achieving this purpose, but this has become even more acute with the current farm labor crisis. Through the use of the instant invention, one man can bale and palletize and thereafter take the pallets or other receiving devices to storage without the need of even lifting a bale. This not only saves labor, but results in a significant additional advantage in that the bale is stored immediately without chance of weathering.

To implement this invention, I provide in combination with a baler and a load pallet or wagon, a movable baler chute which has means for moving the loaded bale chute so as to unload the bales in rows and layers.

DETAILED DESCRIPTION

The invention is described in combination with the accompanying illustrative embodiment in which:

FIG. 2 is a schematic side elevational view of apparatus embodying the invention;

FIG. 3 is a schematic rear end elevational view of the apparatus seen in FIG. 2;

FIG. 5 is an enlarged fragmentary view of the traversing and dumping mechanisms; and FIG. 6 is an enlarged fragmentary horizontal sectional view through one of the corner posts.

Figure 1:
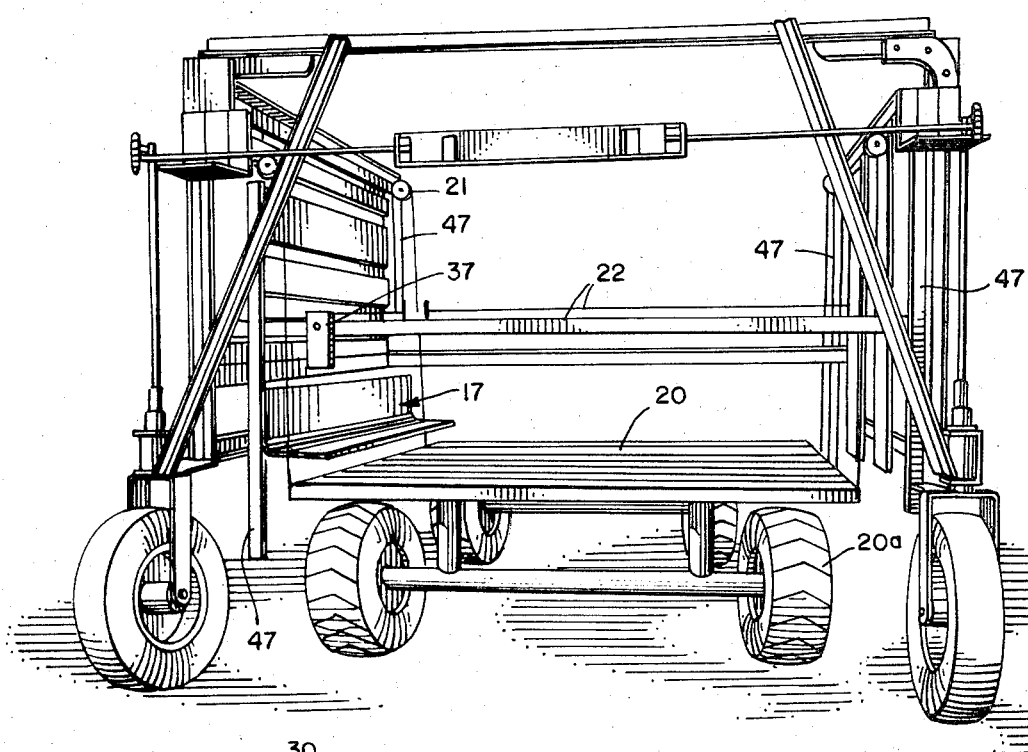
FIG. 1 is a perspective view of the inventive apparatus.

In the illustration given and with reference first to FIG. 2, the numeral 10 designates generally a mobile frame equipped with front wheels 11 and rear wheels 12 which are hydrostatically driven. The frame 10, at its forward end, has a chassis 13 housing an engine (not shown). This permits self propulsion of the mobile frame or vehicle 10 toward and into windrows of hay generally designated 14. The windrows of hay 14 are received by a pickup 15 and fed to a bale compactor 16 of conventional design and formed into bales B, the elements 15 and 16 constituting the baler.

Figure 4:
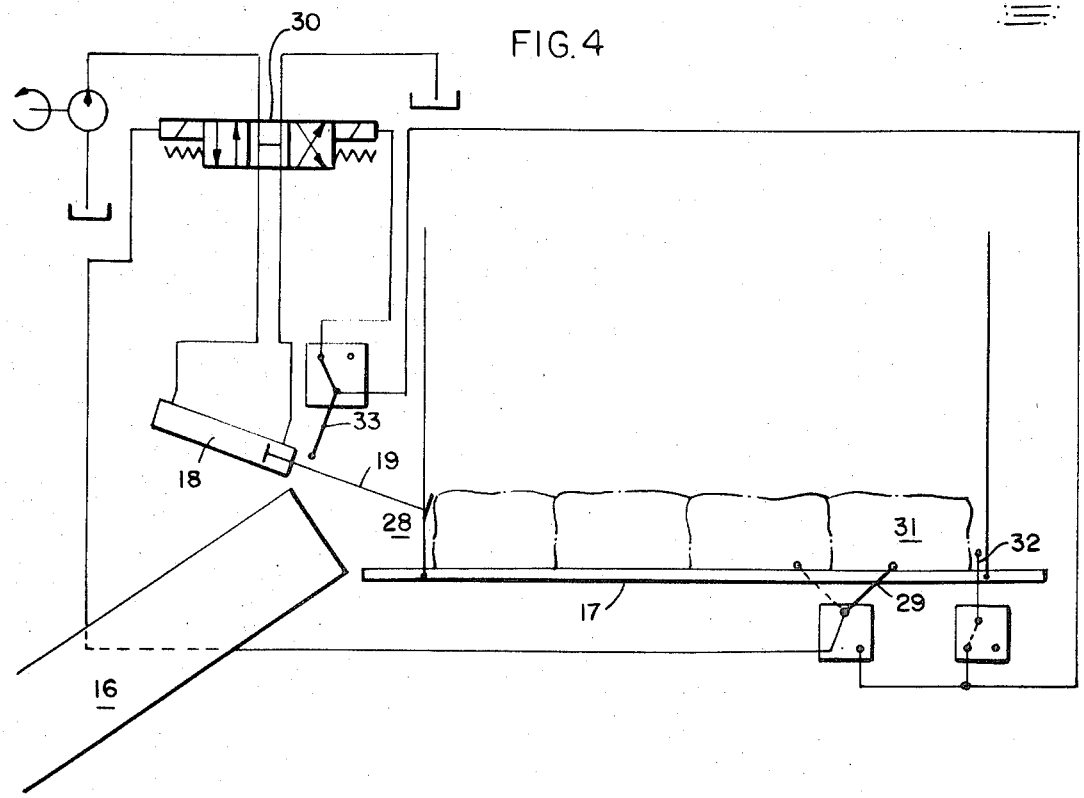
FIG. 4 is a schematic side elevational view showing certain control features.

Bales B issuing from the compactor 16 are delivered to a chute generally designated 17 (see also FIG. 1). Operably associated with both the compactor 16 and chute 17 is a cylinder and piston rod unit generally designated 18 which is programmed to be actuated by the passing of every fourth bale. In FIG. 4, The rod 19 is seen extended to position the four bales for relocation. When the fourth bale passes underneath the cylinder and piston rod unit 18, the unit is actuated to break the flow of bales, thereby developing sufficient sequence time to position the bales B properly on the mobile frame 10 while the baling function of the compactor 16 continues at a steady pace. Here it should be noted that the receiver 20 (see FIG. 1) for the bales may be a pallet provided on skids or wheels 20a, as shown. The frame 10 is equipped with a plurality of winches 21 for elevating the wheeled pallet 20.

To achieve the unloading function once the chute 17 receives a predetermined number of bales (four in the illustration given), the chute 17 is traversed laterally (i.e., horizontally) of the frame 10 under the guidance of a pair of longitudinally spaced traversing mechanisms 22. If the row of bales is to be deposited in the position designated 23 in FIG. 3, the chute 17 is traversed substantially across the frame 10, and, at the proper location, is tilted by means of the cylinder mechanism 24 to dump the requisite number of bales onto the wheeled pallet 20, after which the chute 17 is retraversed to receiving position wherein it is aligned with the compactor 16.

After the last row of bales in a given layer, as at 25 (see FIG. 3), is deposited, the apparatus is capable of starting another layer, as by depositing a subsequent row in the position designated 26 in FIG. 3. For this purpose, I provide a plurality of winches as at 27 equipped with suitable cables for elevating the chute 17, traversing mechanisms 22, and cylinder mechanism 24 to proper elevation prior to traversing and tilting.

In operation, the compactor 16 pushes four bales onto the chute 17. The appearance of the fourth bale in the position 28 (see FIG. 4) actuates a contact arm 29 (from the dotted to the solid line position) which energizes a directional control valve 30. Valve 30 delivers pressure fluid to cylinder 18 to extend rod 19. When the initial bale reaches the position 31, contact is made with switch arm 32 which signals valve 30 to retract the piston rod 19. Retraction continues until sensing element 33 is reached, whereupon a further signal is delivered to valve 30 to position its spool in neutral.

The sequence of operating winches 27 and dumping cylinder mechanism is accomplished by a programming device 34 which may employ cam actuated solenoids to provide for the row and dump sequencing. For example, I employ hydraulic directional valves operating hydraulic motors on the wiches 27 and a hydraulic motor 35 driving a rack and pinion for translating the chute 17.

After the receiver 20 has been completely loaded, the winches 21 are actuated (as by the device 34) to lower the wheeled pallet receiver to the ground for removal from the frame 10.

Advantageous operation is achieved when the winches 27 are driven by an electro hydraulic mechanism having a tape programmed for vertical motion. The bale holding chute 17 is also driven by the electro hydraulic pulse motor (provided as part of mechanism 34) with a tape programmed for horizontal movement. The electrical pulsing here takes the place of the feed back sensors usually connected with servomechanisms. One pulse from the generator can give a desired number of degrees of rotation of the winches or rack and pinion traversing gear of the chute, with the tape indicating the row and layer where the load is to be deposited.

The traversing mechanism 22 and the dump mechanism 24 are illustrated in greater detail in FIG. 5. Each of the traversing mechanisms 22 includes a transversely extending rack 36 which is engaged by a pinion 37. The pinion 37 is rotatably supported within a casing 37 which rides on the rack 36 by means of rollers 39 which engage the upper surface of the rack. The pinions 37 of each of the traversing mechanisms are joined for common rotation by a shaft 41, and the shaft 41 is driven by the hydraulic motor 35.

The cylinder mechanism 24 is secured to the housing 38 on the rack farthest away from the bale compactor 16. A hydraulic cylinder 42 is pivotally connected at 43 to the casing 38, and a piston 44 is pivotally connected to the chute 17 at 45. The chute is pivotally connected to each of the casings 38 by a hinge 46. The chute 17 is formed of relatively rigid metal or the like so that the chute can be dumped by only a single cylinder mechanism connected to one of the housings 38.

The racks 36 are guided for sliding vertical movement by four vertically extending rails 47 (FIG. 1) mounted on the frame. FIG. 6 is a transverse cross section taken through one of the corner posts 47, and the corner posts are seen to be generally C-shaped, having a vertically extending slot 48. Each end of each rack 36 extends through the slot of a corner post, and the rack is guided for sliding vertical movement by a pair of rollers 49 which are rotatably mounted on the end of the rack by means of shaft 50. Each end of each rack is raised by a winch 27, which are operated by hydraulic motors.

While in the foregoing specification a detailed description of a specific embodiment of the invention has been set forth for the purpose of illustration, it is to be understood that many of the details herein given may be varied considerably by those skilled in the art without departing from the spirit and scope of the invention.

I claim:

1. A mobile hay baler and palletizer comprising a mobile frame, a baler operably associated with said frame, a movable baler chute positionably mounted on said frame and alignable in one position with the output of said baler, receiving means on said frame for receiving rows of bales, and traversing and lifting means operably associated with said chute for moving the same into a plurality of positions and thereafter orienting said chute for depositing the bales therefrom, hydraulic cylinder means including an extensible hydraulic piston, extending between the traversing means and the chute, the chute being pivotally secured to the traversing means whereby the chute may be pivoted for depositing the bales therefrom by extension of the piston.

2. The structure of claim 1 in which said mobile frame is also equipped with a cylinder and piston rod unit for interrupting the flow of bales from said baler to said chute to provide time for sequencing the movements of said chute.

3. The structure of claim 1 in which said receiving means is a wheel-equipped pallet removably supported within said mobile frame.

4. The structure of claim 1 in which said traversing means includes elongated rack means on said frame, pinion means operatively associated with said rack means for longitudinal movement therealong, and means connecting the pinion means to the chute.

5. The structure of claim 4 in which said rack means is mounted, for vertical movement along said frame, said lifting means including a winch for raising and lowering the rack means.

6. Apparatus for handling hay bales comprising a self propelled, mobile frame, a baler on said frame, a horizontal pallet removably supported on said frame, a movable baler chute positionably mounted on said frame and alignable in one position with the output of said baler to receive a plurality of bales sufficient to make up one longitudinal row on said pallet, said frame being equipped with traversing, lifting and dumping means coupled to said chute to deposit rows of bales in stacks in side by side relation on said pallet, said frame being equipped with control means for programming the traversing, lifting and dumping means to provide a rectangular solid arrangement of bales on said horizontal pallet, and winch means on said frame for raising and lowering said pallet whereby said pallet is adapted to travel with said frame during baling and after completion of loading be deposited on the ground for subsequent removal without the need for reaccumulation of bales and without the need for substantial interruption of the operation of the baler.

* * * * *